(12) United States Patent
Campbell et al.

(10) Patent No.: US 7,302,558 B2
(45) Date of Patent: Nov. 27, 2007

(54) SYSTEMS AND METHODS TO FACILITATE THE CREATION AND CONFIGURATION MANAGEMENT OF COMPUTING SYSTEMS

(75) Inventors: David Campbell, Atherton, CA (US); Matthew Buller, New York, NY (US); Jason Verch, New York, NY (US)

(73) Assignee: Goldman Sachs & Co., New York, NY (US)

( * ) Notice: Subject to any disclaimer, the term of this patent is extended or adjusted under 35 U.S.C. 154(b) by 454 days.

(21) Appl. No.: 11/042,039

(22) Filed: Jan. 25, 2005

(65) Prior Publication Data

US 2006/0168436 A1 Jul. 27, 2006

(51) Int. Cl.
*G06F 9/00* (2006.01)
(52) U.S. Cl. .............................. 713/1; 713/2; 713/100; 709/217
(58) Field of Classification Search .................. 713/1, 713/2, 100; 709/217
See application file for complete search history.

(56) References Cited

U.S. PATENT DOCUMENTS

| | | | |
|---|---|---|---|
| 2002/0077823 A1* | 6/2002 | Fox et al. | 704/260 |
| 2003/0110234 A1* | 6/2003 | Egli et al. | 709/217 |
| 2004/0123284 A1* | 6/2004 | Bryant et al. | 717/174 |
| 2005/0165906 A1* | 7/2005 | Deo et al. | 709/217 |

* cited by examiner

*Primary Examiner*—Chun Cao
*Assistant Examiner*—Malcolm D Cribbs
(74) *Attorney, Agent, or Firm*—Buckley, Maschoff & Talwalkar LLC

(57) ABSTRACT

Systems and methods are provided to facilitate the creation and configuration management of computing systems. According to some embodiments, component and configuration information associated with a computing system to be created is received. In addition, a target hardware platform to be associated with the computing system is determined. Based on the component and configuration information, the target hardware platform, and a pre-defined rule set, build information is automatically determined and made specific for the target hardware platform. It may then be arranged for the computing system to be created and/or configured on the target hardware platform in accordance with the build information.

19 Claims, 13 Drawing Sheets

FIG. 7

| RULE IDENTIFIER 702 | MACRO FUNCTION 704 | CONFIGURATION FUNCTION 706 | HARDWARE PLATFORM IDENTIFIER 708 | PRIMITIVE FUNCTIONS 710 | REQUIRED HW/SW 712 | BUILD DATABASE IDENTIFIER 714 |
|---|---|---|---|---|---|---|
| R01 | INSTALL OS | C_101 | INTEL PENTIUM 4 | BUILD OS A; SERVICE PACK 1 | LEVEL II | BDB_1_101 |
| R02 | INSTALL OS | C_101 | AMD | BUILD OS A.1; SERVICE PACK 2 | 4 MEG RAM | BDB_101 |
| R03 | PATCH DRIVER | C_105 | MAC | DRIVER_002 | MAC OS | BDB_2_101 |
| R04 | EMAIL APPLICATION | NONE | 3 GHZ CPU | FILE_01; FILE_02; FILE_03 | NONE | BDB_102 |
| R05 | CREATE X STATION LAN | C_132 | HP_101 | P01; R01; R02; P10 | X+2 AVAILABLE TERMINALS | NONE |

US 7,302,558 B2

SYSTEMS AND METHODS TO FACILITATE THE CREATION AND CONFIGURATION MANAGEMENT OF COMPUTING SYSTEMS

COPYRIGHT AUTHORIZATION

A portion of the disclosure of the patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present invention relates to computer system. In particular, the present invention relates to systems and methods to facilitate the creation and configuration management of computing systems.

BACKGROUND

In some cases, an enterprise will need to create a number of computing systems. For example, a company might need to install and configure an Operating System (OS), device drivers, and software applications on several newly purchased servers or Personal Computers (PCs). Although an operator could manually create each computing system (e.g., by installing and configuring the appropriate components on each PC), such an approach can be impractical (e.g., there might not be an operator available at all times) and time consuming. Moreover, because different types of hardware and software may need to be combined in different ways, errors can occur when computing systems are manually created (e.g., an administrator might install an outdated device driver or correct a mis-configured security setting).

As another approach, FIG. 1 is a block diagram overview of a system 100 in which an installing device 100 provides information to a first target machine 120 and a second target machine 122. In particular, the installing device 100 transmits a number of files to the first target machine 120 in order to create a computing system. For example, the installing device 100 might transmit to the first target machine 120 files that are required to install an OS. Note, however, that a typical OS (e.g., Microsoft® WINDOWS XP or Linux) can require a large number of files (e.g., tens of thousands of files may need to be transmitted). Moreover, different components and configurations may need to be sequentially installed to complete the build (e.g., the installing device 110 might install $f_X$ followed by $f_Y$ and then $f_X$). As a result, it can take a substantial amount of time to create the computing system in this way. For example, each computing system might take twenty minutes to create. In addition, the installing device 110 might not begin creating a computing system on the second target machine 122 until all of the files have been installed on the first target machine 120—significantly increasing the time required to create a large number of computing systems. Note that a skilled administrator may still be needed to manually configure and re-configure the computing systems (e.g., when a new security patch is released for an OS).

SUMMARY

To alleviate problems inherent in the prior art, the present invention introduces systems and methods to facilitate the creation and configuration management of computing systems.

According to some embodiments, configuration information associated with a computing system to be created is received. In addition, a target hardware platform to be associated with the computing system is determined. Based on the configuration information, the target hardware platform, and a pre-defined rule set, build information is automatically determined. It may then be arranged for the computing system to be created and/or configured on the target hardware platform in accordance with the build information.

Another embodiment comprises: means for receiving configuration information associated with a computing system to be created; means for determining a target hardware platform to be associated with the computing system; means for automatically determining build information based on the configuration information, the target hardware platform, and a pre-defined rule set; and means for arranging for the computing system to be created and/or configured on the target hardware platform in accordance with the build information.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 7 is a tabular representation of a portion of a rule set database according to one embodiment of the present invention.

DETAILED DESCRIPTION

Some embodiments of the present invention are associated with a "hardware platform." As used herein, the phrase "hardware platform" may refer to any type of computing device, including PCs, servers, networks, workstations, laptop computers, and handheld devices (e.g., cell phones). Moreover, the term "build" may refer to a specific version or set of versions of components (e.g., software programs and applications) and configurations that are associated with a hardware platform (e.g., that have been or will be installed on the hardware platform).

In addition, some embodiments are associated with a "computing system." As used herein, the phrase "computing system" might refer to, for example, a hardware platform on which one or more software programs, files, and/or applications are installed and configured. For example, a computing system could be a PC on which an OS, a set of device drivers, and a database application are installed and configured. A computing system might also be associated with a number of different hardware platforms and associated builds (e.g., a network of PCs).

Note that the software associated with a computing system might include components (e.g., an OS, device drivers, or applications such as database, email, or network applications), patches, updates, configuration information (e.g., setting an Internet Protocol address or security setting to a particular value), financial simulations, or any other type of software.

Environment

Figure 1:
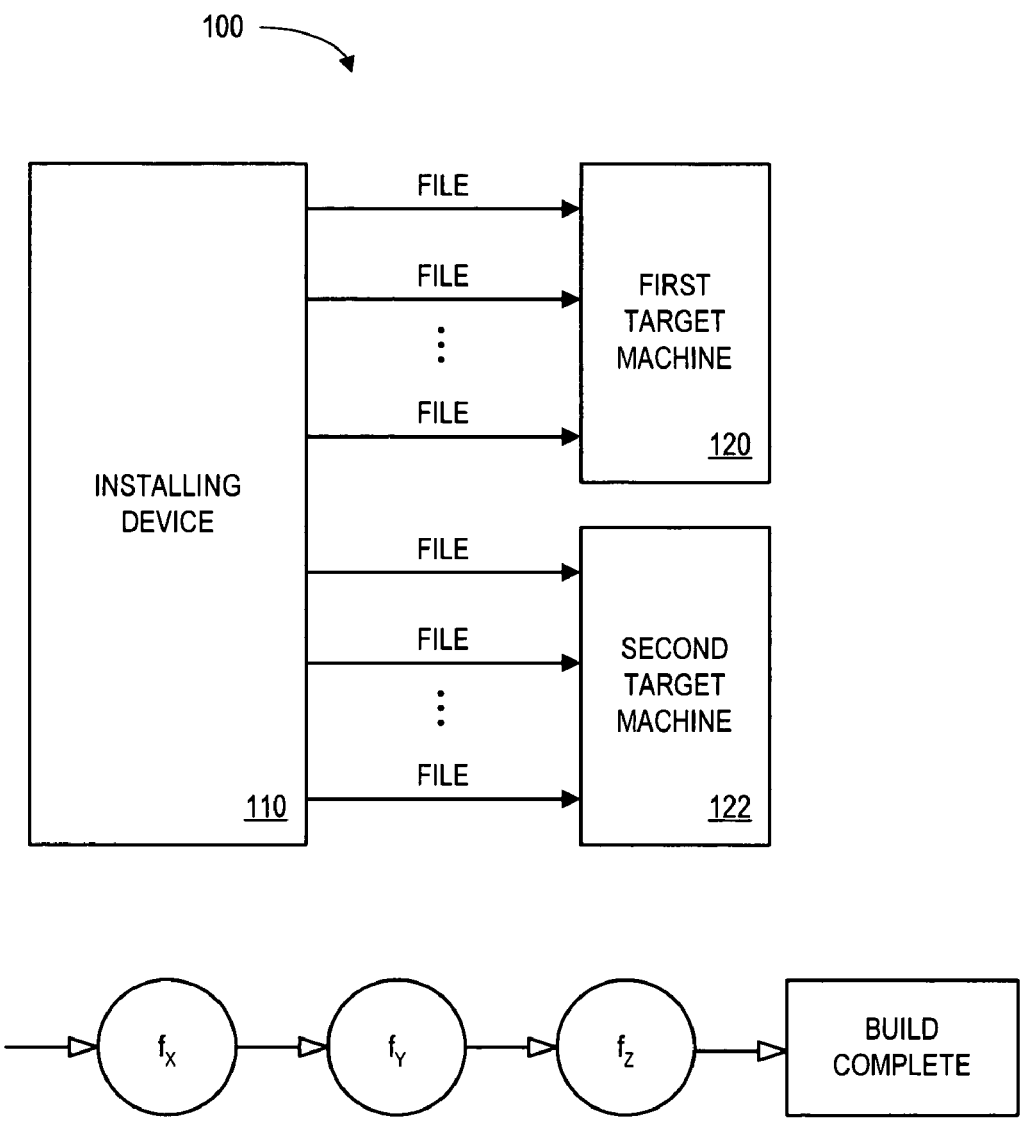
FIG. 1 is a block diagram overview of a system to create computing systems.
Figure 2:
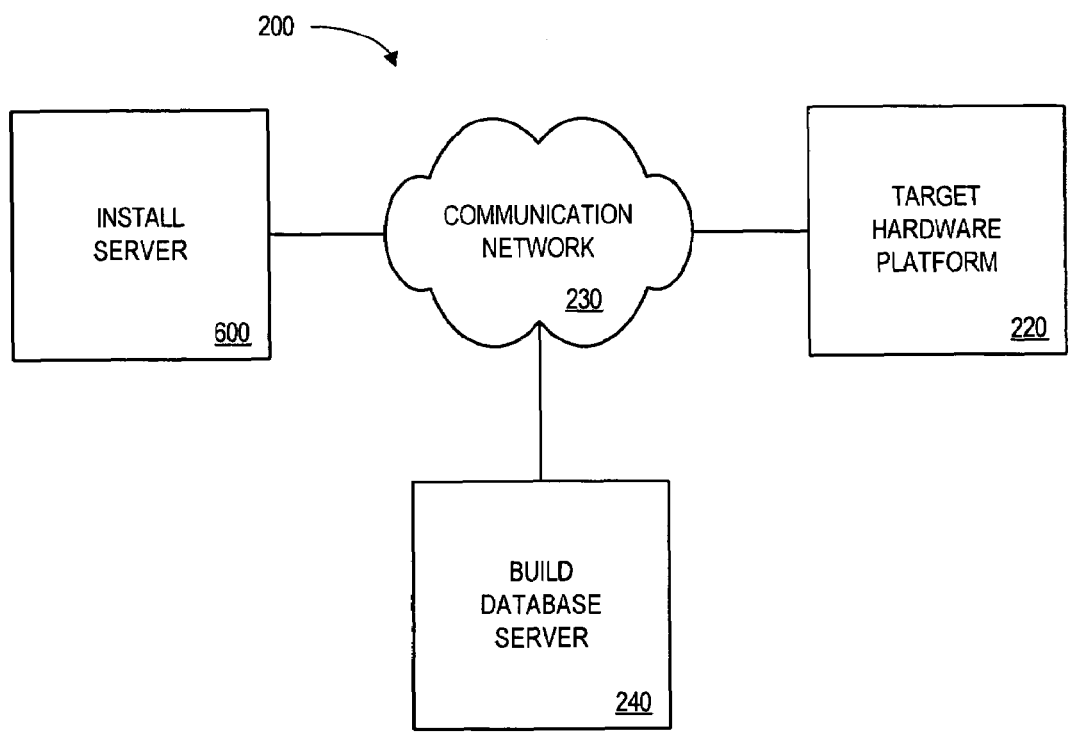
FIG. 2 is a block diagram overview of an environment to create computing systems according to some embodiments.

FIG. 2 is a block diagram overview of a environment 200 to create computing systems according to some embodiments. In particular, an install server 600 may exchange information with a target hardware platform 220 via a communication network 230, such as an Ethernet or IP network. Note that the communication network 230 may be any type of network and might include a number of different networks, such as an intranet, a Local Area Network (LAN), a Metropolitan Area Network (MAN), a Wide Area Network (WAN), a proprietary network, a Public Switched Telephone Network (PSTN), and/or a wireless network.

Figure 3:
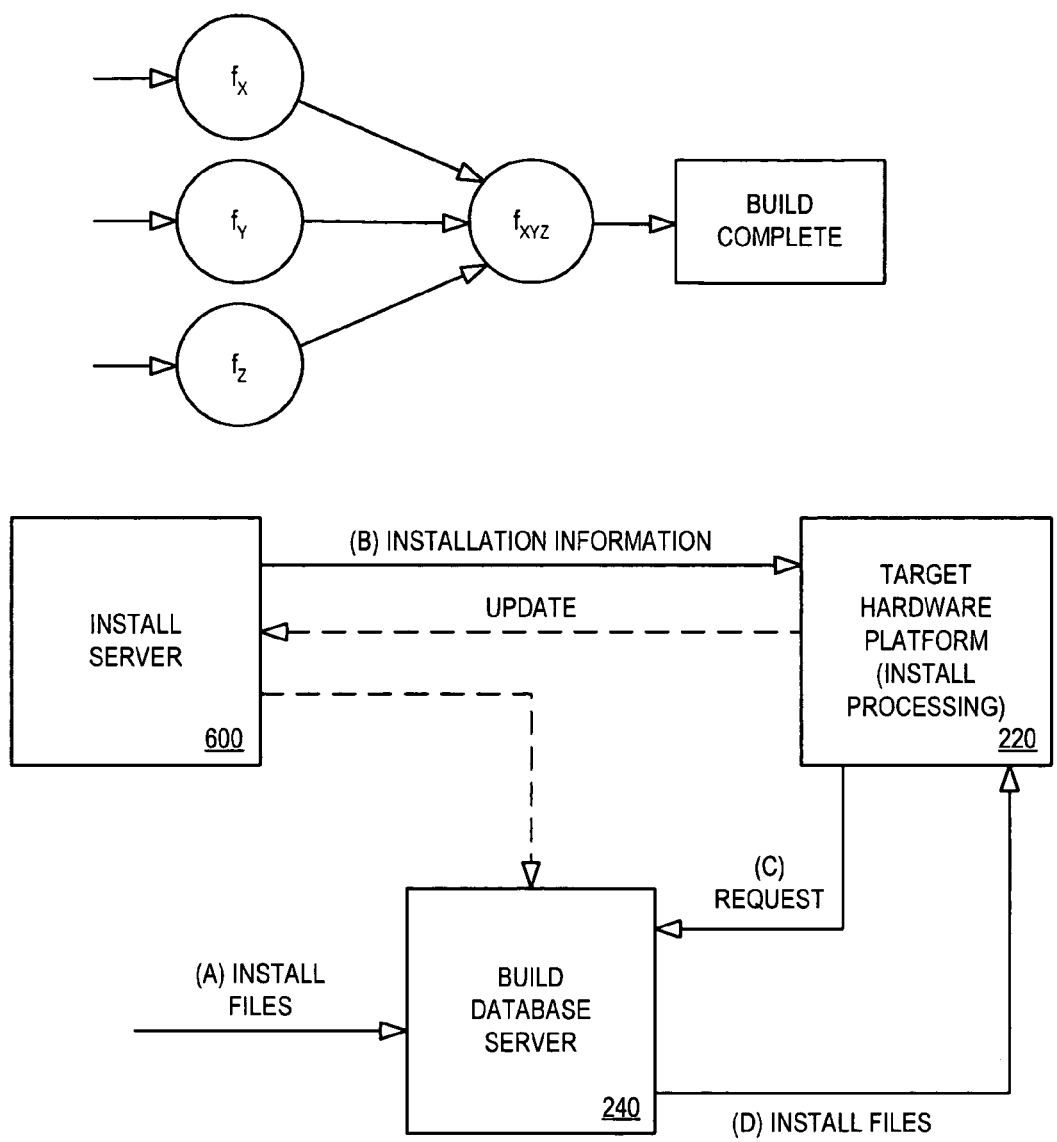
FIG. 3 is an information flow diagram according to some embodiments.

The environment 200 includes a build database server 240 that can also exchange information via the communication network 230. According to some embodiments of the present invention, the install server 600 is used to create a computing system on the target hardware platform 220 as illustrated in FIG. 3. The environment 200 may also be used to manage the configuration of the target hardware platform 220 (e.g., when or after components are installed).

At (A), a set of install files are stored in the build database server 240. The install files may include, for example, information that is needed to create and configure various types operating systems, device drivers, patches, and software applications on different types of hardware platforms.

Initially, the target hardware platform 220 might have only a minimal amount of software installed. For example, the target hardware platform 220 may be able to boot-up and exchange limited information with the install server 600. According to some embodiments, a security check is performed to authenticate and/or verify that the target hardware platform 220, the install server 600, and/or an associated administrator is authorized to create and/or configure a computing system.

At (B), the install server 600 sends installation information to the target hardware platform 220. Instead of including a large number of files that need to be created on the target hardware platform 220, the installation information may include instructions, pointers, or other information that can be interpreted by the limited software present in the target hardware platform 220. For example, based on the installation information, the target hardware platform 220 might generate and transmit a request to the build database server 240 at (C). In response to the request, the build database server 240 may transmit the appropriate install files (e.g., including data, procedures, components, and configuration information) to the target hardware platform 220 at (D). Note that the install files might be transmitted in a compressed format (e.g., to be extracted at the target hardware platform 220). According to some embodiments, the transmission of these files may be interrupted (e.g., due to a failure) and later resumed from the point of interruption. The target hardware platform 220 may then use the install files to create the appropriate computing system (e.g., by installing and configuring a number of software components). According to some embodiments, the target hardware platform 220 may transmit an update to the install server 600 (e.g., when the install is successfully completed).

After transmitting the installation information to the target hardware platform 220, the install server 600 is free to create another computing system (e.g., on another target hardware platform). Moreover, the installation of a number of different components and associated configurations may be combined (e.g., the installation of $f_X$, $f_Y$, and $f_Z$ may be combined into a single $f_{XYZ}$). In this way, a single install server 600 might be able to create a large number of computing system in a relatively short period of time (e.g., because multiple target hardware platforms can be working simultaneously and in parallel). In addition, the approach is scalable. For example, an install server 600 might be able to configure one thousand servers in a relatively short period of time.

Figure 4:
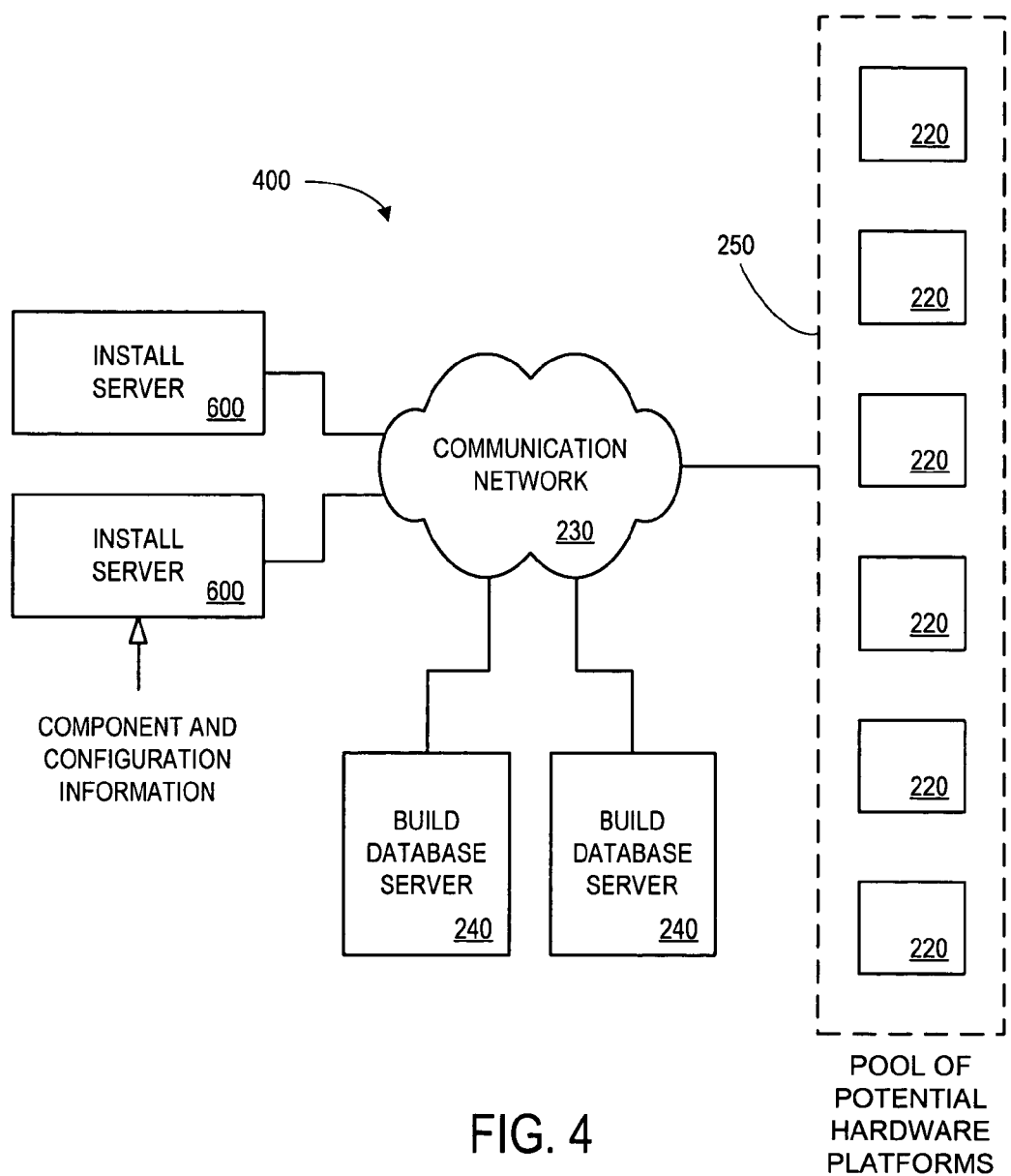
FIG. 4 is a block diagram overview of a system to create computing systems according to some embodiments.

Although a single install server 600 and target hardware platform 220 are shown in FIGS. 2 and 3, any number of these devices may be used. For example, FIG. 4 is a block diagram overview of a system 400 to create computing systems according to some embodiments. In this case, multiple install servers 600 can exchange information with a pool 250 of potential hardware platforms 220 through a communication network 230. Moreover, multiple build database servers 240 can also communicate through the network 230.

According to some embodiments, an install server 600 may receive component and/or configuration information. For example, an operator might indicate to an install server 600 that he or she needs a computing system with a particular OS and database application configured with particular parameter values. Based on the component and configuration information, the install server 600 may select one of the potential hardware platforms 220 from the pool 250.

The selection might be based on, for example, the particular hardware characteristics of each hardware platform 220 (e.g., a requested software application might have processor and/or memory requirements). The hardware characteristics may be, for example, retrieved from a database. In some cases, each hardware platform 220 reports hardware characteristics to the install server 600 (e.g., using a "registration" message that is transmitted to the install server 600 when the hardware platform 220 boots up). According to some embodiments, a hardware platform 220 might decide which install server 600 will receive this type of information (e.g., the least busy, closest, or most appropriately secure install server 600 might receive the registration message).

According to some embodiments, an operator can select a particular hardware platform 220. In this case, the install server 600 might verify that the selected hardware platform 220 is appropriate based on the component and configuration information.

The install server 600 or target hardware platform 220 may then receive information from one (or both) of the build database servers 240. For example, the target hardware platform 220 may decide to receive information from the least busy build database server 240 or the one that has the fastest network connection.

In this way, the system 400 may be used to rapidly create, configure, and re-configure a large number of computing systems in an efficient and consistent manner.

Method

Figure 5:
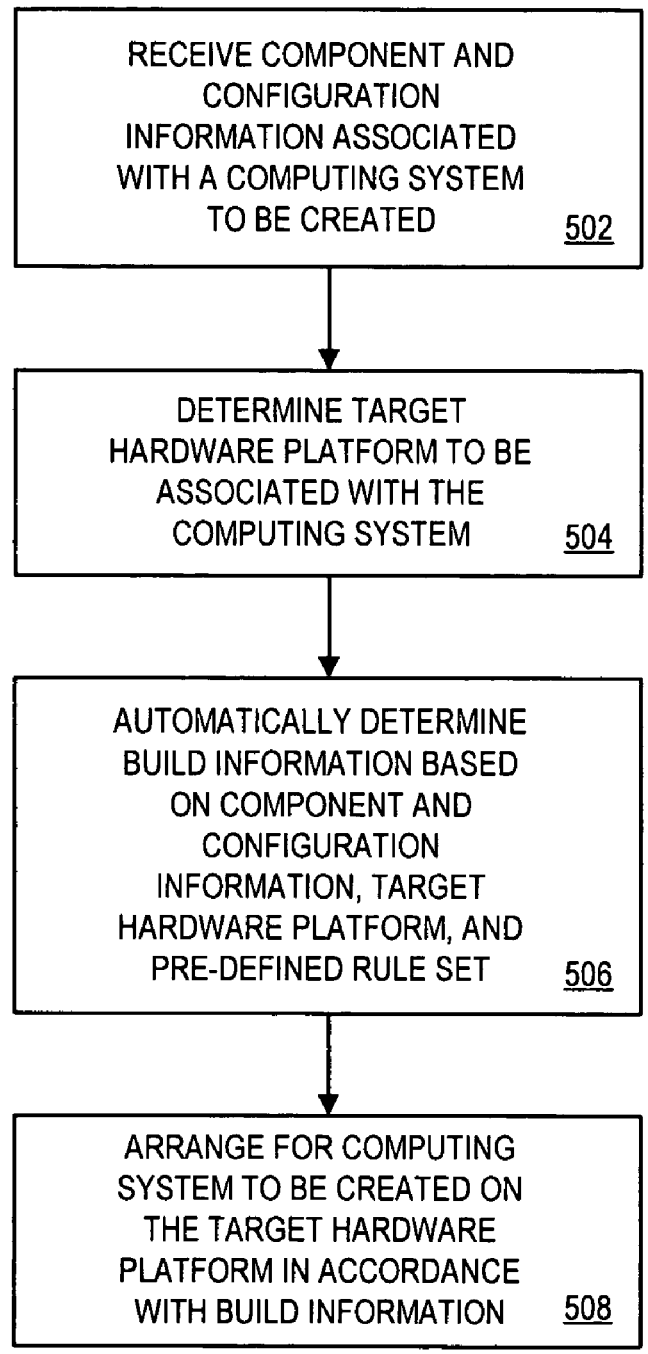
FIG. 5 is a flow chart of a method according to some embodiments.

FIG. 5 is a flow chart of a method according to some embodiments. The method may be performed, for example, by an install server 600. The flow charts described herein do not imply a fixed order to the steps, and embodiments of the present invention may be practiced in any order that is practicable.

At 502, component and configuration information associated with a computing system to be created are received. For example, the component and configuration information might be received from an operator (e.g., a system administrator), a user, or another device.

According to some embodiments, the received component and configuration information includes one or more macro-function instructions $f_X\{°\}$. For example, an operator might provide the following macro instructions to an install server 600:

BUILD OS
INSTALL SECURITY PATCH
INSTALL EMAIL APPLICATION

Note that each of these three macro-instructions may be associated with configuration information. Moreover, the configuration of a later function might include adjustments to components or configurations associated with prior functions (e.g., the install email application function might modify a configuration setting associated with the previously installed security patch). As other examples, the macro-function instructions may be associated with a driver, an application, and/or a service.

At 504, a target hardware platform to be associated with the computing system is determined. For example, the install server 600 might receive an indication of the target hardware platform from an operator via a Graphical User Interface (GUI). The install server 600 may then determine if the indicated target hardware platform is appropriate based on the component and configuration information. For example, a particular set of macro-function instructions $f_{1-3}\{°\}$ might require that the target hardware platform have at least a 3.0 Gigahertz (GHz) INTEL® PENTIUM 4 processor, a 20 Gigabyte (GB) of available space on a hard disk drive, and 128 Megabytes (MB) of Random Access Memory (RAM). If the hardware platform selected by the operator does not meet these requirements, the install server 600 might ask the operator to select another one (and perhaps suggest a more suitable PC).

According to another embodiment, the install server 600 automatically selects a target hardware platform from a set of available hardware platforms in accordance with the component and configuration information. For example, the install server 600 might select the best available hardware platform. In another embodiment, the target hardware platform that most nearly matches the requirements of macro-function instructions $f_{1-3}\{°\}$ is selected. If no appropriate hardware platform is available, the install server 600 might suggest that the operator modify one or more of the software components or configurations that were requested.

At 506, build information is automatically determined based on the component and configuration information, the target hardware platform, and a pre-defined rule set. For example, the install server might translate one or more macro-function instructions into a plurality of primitive functions (e.g., lower level functions).

The pre-defined rule set might simply be a set of primitive function that are always associated with a particular macro-function instruction. According to some embodiments, the rule set establishes or is associated with an abstracted meta-language that can be used to describe a desired system and/or functionality across different platforms. As a result, the knowledge and skill that an administrator must have in order to accurately and efficiently create computing systems may be reduced.

In some cases, the install server 600 may translate a macro-function instruction based at least in part on the target hardware platform. That is, build information may be made specific for the target hardware platform. For example, one type of PC might need one type of OS while another type of PC needs another type of OS. Similarly, different workstations might need different device drivers (e.g., depending on the display monitors and printers associated with the workstations) or may need to be configured differently. Note that according to other embodiments, the build information is determined by a target hardware platform instead of the install server 600.

At 508, it is arranged for the computing system to be created and configured on the target hardware platform in accordance with the build information. For example, the install server 600 may transmit installation information to the target hardware platform, and the installation information may be adapted to be executed by the target hardware platform in order to create the computing system. According to some embodiments, the target hardware platform then retrieves install files (e.g., associated with components and associated configurations) from a build database server in accordance with the installation information.

Install Server

Figure 6:
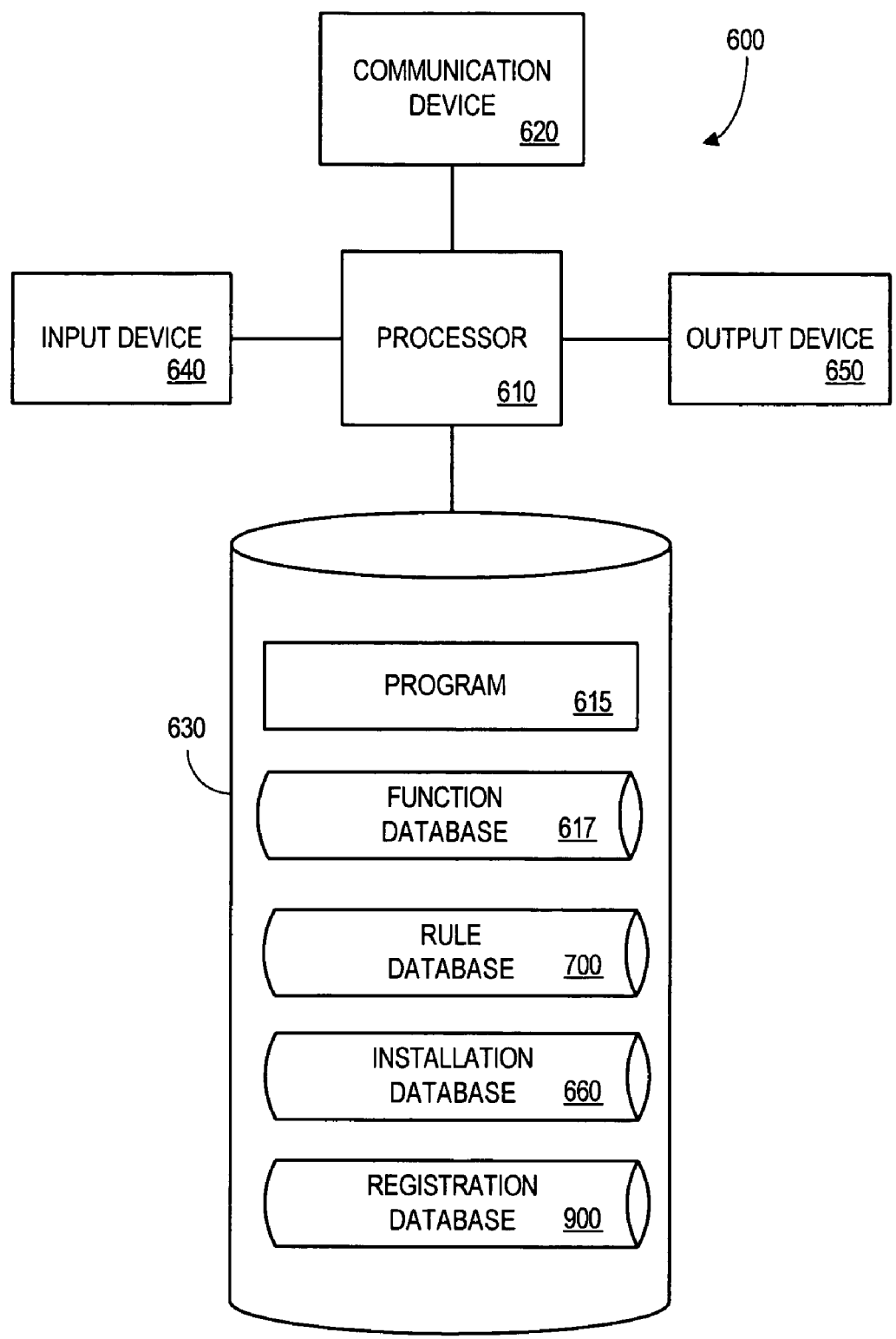
FIG. 6 is a block diagram overview of an install server according to some embodiments.

FIG. 6 is a block diagram overview of an install server 600 that may be descriptive of the device shown, for example, in FIGS. 2 through 4 according to some embodiments of the present invention. The install server 600 comprises a processor 610, such as one or more INTEL® Pentium® processors, coupled to a communication device 620 configured to communicate via, for example, a communication network. The communication device 620 may be used to communicate, for example, with one or more target hardware platforms 220. According to one embodiment, the communication device 620 is also used to communicate with other install servers.

The processor 610 is also in communication with a storage device 630. The storage device 630 may comprise any appropriate information storage device, including combinations of magnetic storage devices (e.g., magnetic tape and hard disk drives), optical storage devices, and/or semiconductor memory such as RAM devices and Read Only Memory (ROM) devices.

The storage device 630 stores a program 615 for controlling the processor 610. The processor 610 performs instructions of the program 615, and thereby operates in accordance with the present invention. For example, the processor 610 may receive component and configuration information associated with a computing system to be created and determine a target hardware platform to be associated with the computing system. The processor 610 may also automatically determine build information based on the component and configuration information, the target hardware platform, and a pre-defined rule set. The processor 610 may then arrange for the computing system to be created and configured on the target hardware platform in accordance with the build information.

As used herein, information may be "received" by or "transmitted" to, for example: (i) the install server 600, an operator, or a target hardware platform; or (ii) a software application or module within the install server 600 from another software application, module, or any other source.

Figure 9:
FIG. 9 is a tabular representation of a portion of a registration database according to one embodiment of the present invention.

As shown in FIG. 6, the storage device 630 also stores: a function database 617 (e.g., to store information associated with specific hardware, software, and/or generic abstract configuration functions); a rule database 700 (described with respect to FIG. 7); an installation database 660; and a registration database 900 (described with respect to FIG. 9). The installation database 600 may store, for example, information about computing systems that have been, or will be, created by the install server 600. Examples of other databases that may be used in connection with the install server 600 will now be described in detail with respect to FIGS. 7 and 9. The illustrations and accompanying descriptions of the databases presented herein are exemplary, and any number of other database arrangements could be employed besides those suggested by the figures.

Rule Database

Referring to FIG. 7, a table represents the rule database 700 that may be stored at the install server 600 according to an embodiment of the present invention. The table includes entries identifying rules that may be used to translate macro-function instructions $f_x\{°\}$ into primitive functions. The table also defines fields 702, 704, 706, 708, 710, 712, 714 for each of the entries. The fields specify: a rule identifier 702, a macro function 704, configuration information 706, a hardware platform identifier 708, primitive functions 710, required hardware or software 712, and a build database identifier 714. The information in the rule database 700 may be created and updated, for example, based on information received from an operator or system administrator.

The rule identifier 702 may be, for example, an alphanumeric identifier associated with a predetermined rule. The macro function 704 may indicate the high level instruction that may be provided from an operator to the install server 600. The configuration information 706 may define one or more parameters and associated values that should be used to configure the computing system. The hardware platform identifier 708 might be, for example, an alphanumeric identifier (e.g., "HP_01") or may indicate a hardware characteristic associated with the platform (e.g., a type of processor or a location). According to some embodiments, an identifier is based on with a function or group associated with the platforms (e.g., "sales_01" or "human_resources_b).

The primitive functions 710 indicate a set of lower level functions that are associated with the rule's macro function 704. For example, the command "email application" would be translated into: file_01; file_02; file_03. Each file might include, for example, information associated with components, configurations, and/or functions to be performed. Note that in some cases, the same macro function 704 will be translated into different primitive functions 708 based on the hardware platform identifier 708. For example, the "install OS" macro function 704 would be translated into "build OS A; service pack 1" when the hardware platform had an INTEL® Pentium 4 processor and into "build OS A.1; service pack 2" if the platform had an AMD® processor.

The required hardware or software 712 indicates characteristics that a selected target hardware platform must meet in order for the rule to be successfully used to create a computing system. For example, the third entry in FIG. 7 (rule "R03") can only be used to patch a device drive for a Macintosh® computer.

The build database identifier 714 might be, for example, information that will be transmitted from the install server 600 to a target hardware platform. For example, the build database identifier 714 might indicate where in a build database server 240 certain information should be retrieved by the target hardware platform (e.g., the target hardware platform might select a build database server 240 based on the information and/or include the build database identifier 714 in a query that is transmitted to a build database server 240). Note that by updating a single file at the build database server 240, all hardware platforms that subsequently access that file in the future will receive the updated information.

Figure 8:
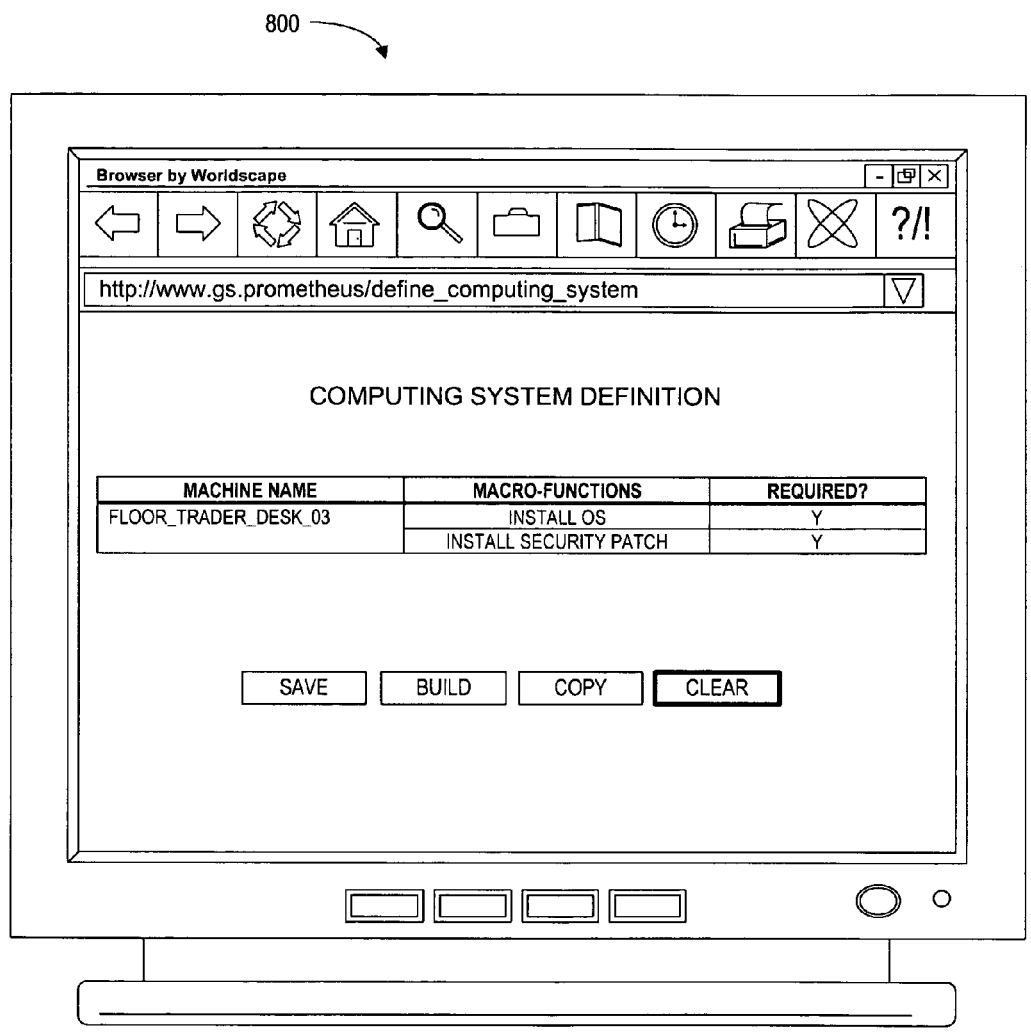
FIG. 8 illustrates a display according to one embodiment of the present invention.

FIG. 8 illustrates a display 800 (e.g., a computer monitor) according to one embodiment of the present invention. In particular an operator might use the display to enter and/or modify information about a computing system that will be created. The display includes a machine name and a number of macro functions to be performed to build and configure the computing system (along with an indication of whether or not the macro functions are required). The install server 600 can then use this information along with the information in the rule database 700 to select a particular piece of hardware that will be used to create the computing system (e.g., the machine named "floor_trader_desk_03"). Moreover, the install server 600 can translate the macro functions and send the appropriate information to the selected hardware (e.g., which in turn can retrieve the information needed to build the system from another source).

Registration Database

Referring to FIG. 9, a table represents the registration database 900 that may be stored at the install server 600 according to an embodiment of the present invention. The table includes entries identifying hardware platforms that may be selected and used to create a computing system. The table also defines fields 902, 904, 906, 908, 910, 912 for each of the entries. The fields specify: a hardware platform identifier 902, a Central Processing Unit (CPU) description 904, a speed description 906, memory and storage abilities 908, a connection description 910, and a status 912. The information in the registration database 900 may be created and updated, for example, based on information received from an operator or system administrator. According to another embodiment, the information in the registration database 900 is created in accordance with information received from hardware platforms. For example, the information might be received when a hardware platform is turned on, when it joins a pool, and/or on a periodic basis.

The hardware platform identifier 902 may be, for example, an alphanumeric identifier associated with a particular PC. The CPU description 904, a speed description 906, memory and storage abilities 908, a connection description 910 identify the particular hardware characteristics associated with the hardware platform. For example, "HP_105" has an 2 GHz INTEL® Pentium 4 processor, 30 Meg of RAM; a 2 Gig hard drive (HD) and a Bluetooth network connection.

The status 912 might indicate, for example, that a particular hardware platform is turned off, is ready to be used to create a computing system ("OK"), or has "failed." The information in the registration database 900 may be used, for example, to create and/or may be updated by the display

Figure 10:
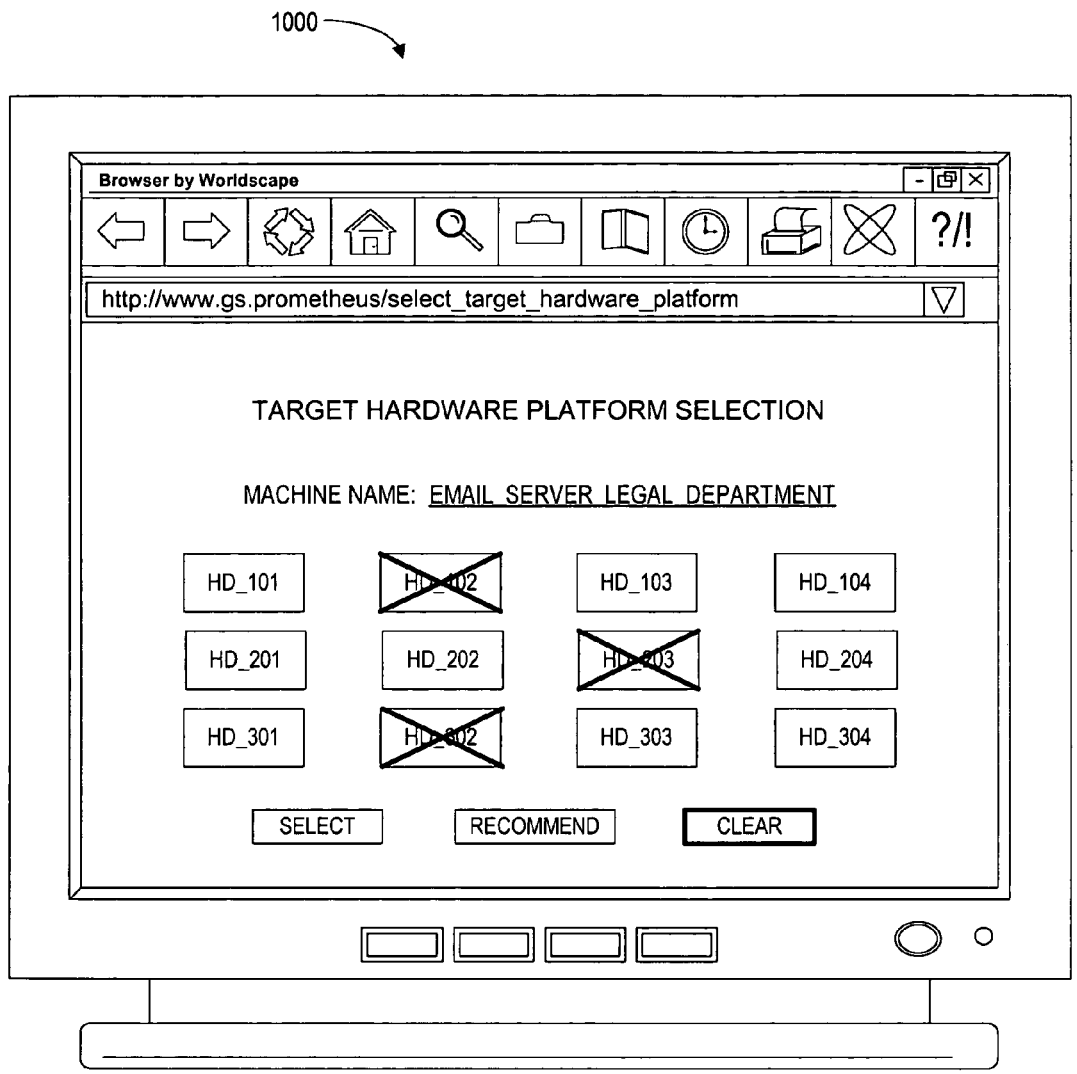
FIG. 10 illustrates a display according to one embodiment of the present invention.

1000 illustrated in FIG. 10. In particular, the display 1000 indicates to the operator a pool of hardware platforms. The display 1000 may also indicate which hardware platforms (i) are turned off, (ii) are already being used for another computing system, and/or (iii) are not appropriate given the macro functions defined by the user (e.g., as illustrate by an "X" in FIG. 10).

Figure 11:
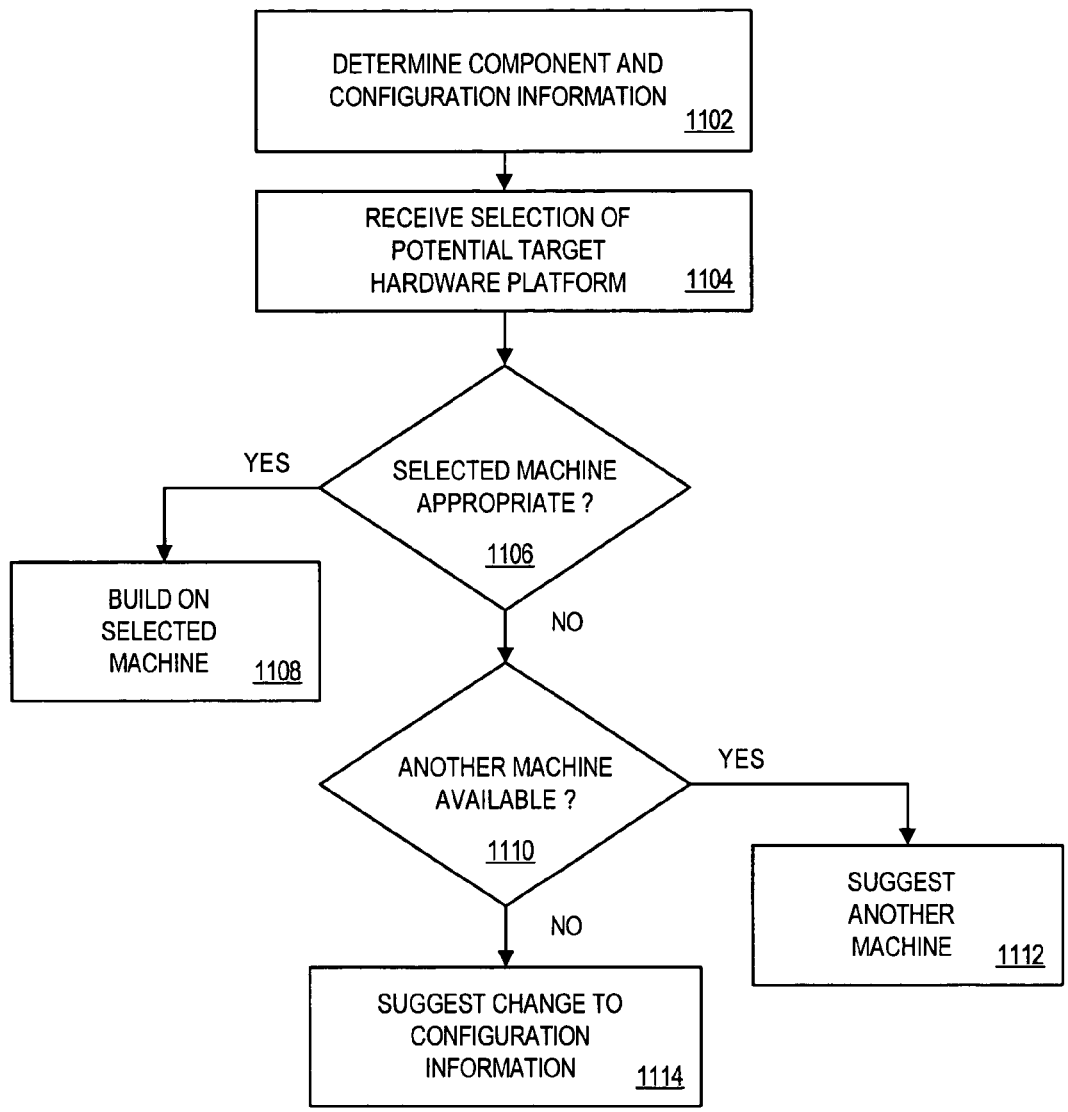
FIG. 11 is a flow chart of a method according to some embodiments.

FIG. 11 is a flow chart of a method according to some embodiments. In this case, component and configuration information are determined at 1102. For example, an install server 600 might receive component and associated configuration information via a display such as the one described with respect to FIG. 8.

At 1104, a selection of a potential target hardware platform is received. For example, an operator might click on a graphical representation of a hardware platform using a display such as the one described with respect to FIG. 10.

If the selected machine is appropriate at 1106, the appropriate computing system is built on the select machine at 1108. For example, the install server 600 might compare the required hardware or software 710 in the rule database 700 (e.g., based on the macro functions defined by the operator) with the CPU description 904, speed description 906, memory and storage abilities 908, and/or connection description 910 stored in the registration database to determine if the selected machine is appropriate.

If the selected machine is not appropriate at 1106, it is determined if another machine is available at 1110 (e.g., another machine that is appropriate). For example, the install server 600 might look through the registration database 900 to determine if any other hardware platform is appropriate. If another machine is available, it may be suggested to the operator at 1112. If no machine in the pool is appropriate, a change to the component or configuration information may be suggested to the operator at 1114.

EXAMPLES

Figure 12:
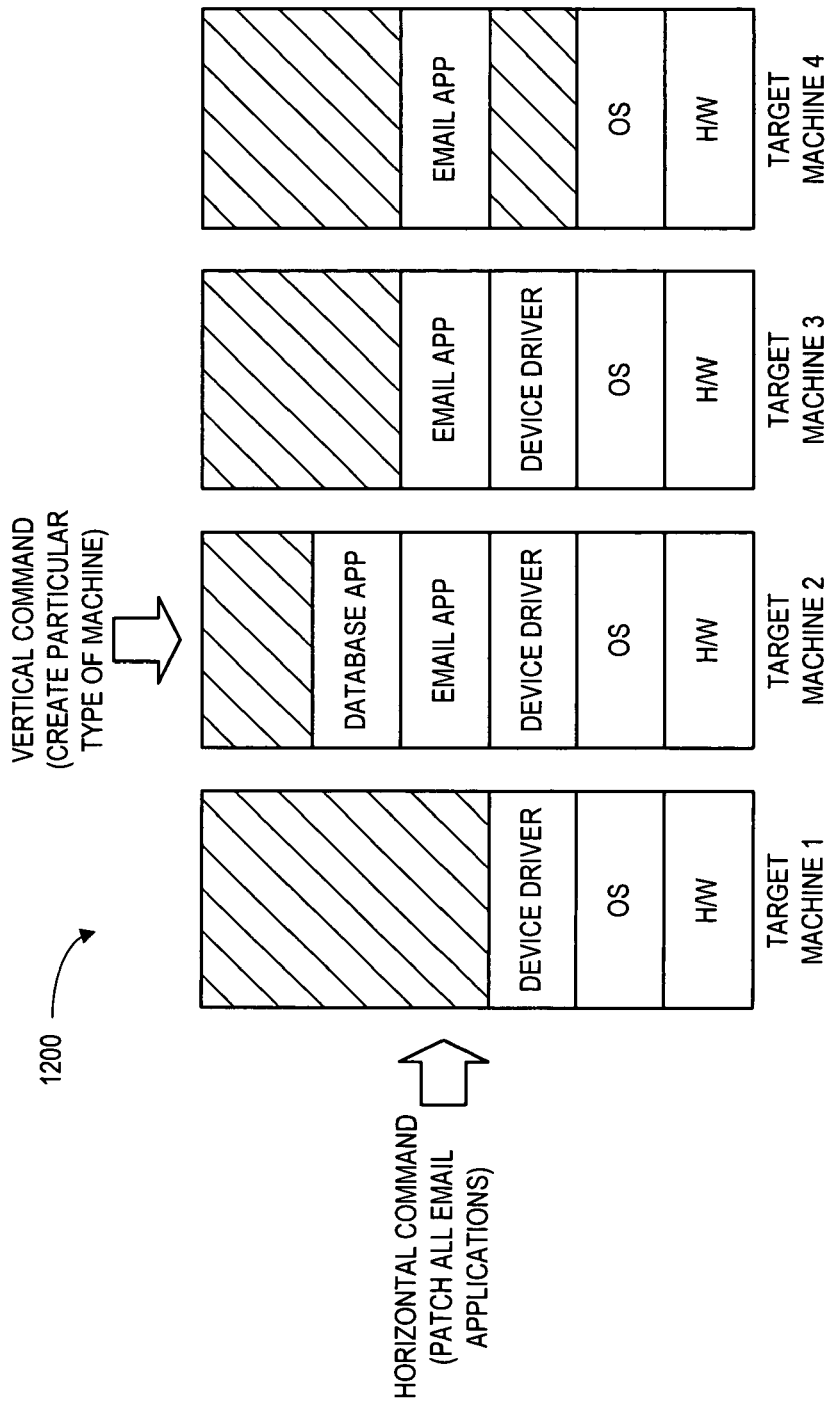
FIG. 12 illustrates horizontal and vertical builds according to some embodiments.

As described here, a set of macro-function instructions $f_x\{°\}$ can be used to define a computing system, such as:
BUILD OS
INSTALL SECURITY PATCH FOR OS
INSTALL EMAIL APPLICATION Each macro-function instruction may be associated with, for example, a component and/or configuration information and can be automatically translated into a set of primitive instructions. According to another embodiment, a single high level command (e.g., "CREATE DATABASE SERVER") may be translated. The high level command might be translated, for example, into a set of macro function instructions (e.g., which in turn are translated into primitive commands) or directly into a set of primitive commands. As illustrated in FIG. 12, such a high-level command may be considered a "vertical" command (e.g., it may update and/or configure a number of different programs in a single target machine). Similarly, a library of "templates" (e.g., pre-coded sets of macro-function instructions) might be accessed and/or modified by an operator. As still another example, an operator might define the task or environment that is needed, and the install server 600 translate that information into the required primitive instructions.

According to some embodiments, a "horizontal" command may also be executed. In this case, a single component, configuration, and/or file in a number of different target machines may be updated. For example, the command "PATCH ALL EMAIL APPLICATIONS" would update and/or configure target machine 2, target machine 3, and target machine 4 in FIG. 12 (note that target machine 1 does not have an email application and therefore does not need to be updated or configured). Such an approach may help a system administrator update and/or configure a relatively large number of machines in an efficient manner.

Figure 13:
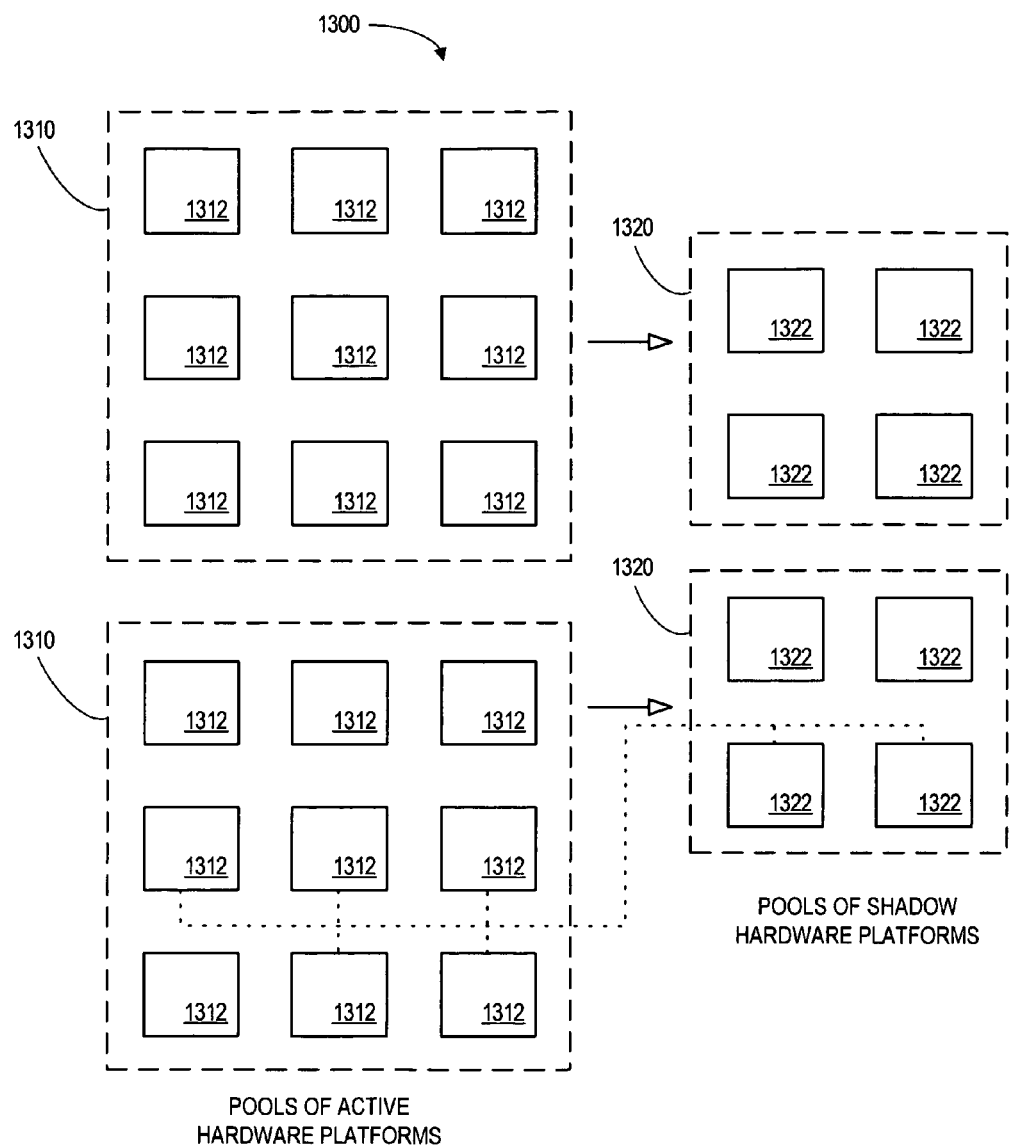
FIG. 13 illustrates shadow pools according to some embodiments.

Because embodiments described herein let a relative large number of computing systems be efficiently created on a consistent basis, the number of emergency backup hardware platforms that an enterprise might need can be reduced. Assume, for example, that an enterprise 1300 illustrated in FIG. 13 has an active pool 1310 that includes eighteen different computing systems 1312 (e.g., each having various hardware and software components) and that none of these computing systems 1312 can ever be unavailable. In this case, the enterprise 1300 might purchase eighteen backup computing systems 1312 to ensure that any failure can be immediately replaced.

Using some embodiments, of the present invention, however, one or more "shadow" pools 1320 of hardware platforms 1322 can be used instead (e.g., a pool having four hardware platforms 1322). When any of the computing systems 1312 in the active pool 1310 fails, an install server can quickly create the appropriate computing system using a hardware platform 1322 from the shadow pool 1320. In this way, the amount of money the enterprise needs to spend on backup machines may be reduced.

According to some embodiments, one or more particular computing systems 1312 are "mapped" or pre-allocated to one or more physical hardware platforms 1322. For example, five computing systems 1312 are mapped to two hardware platforms 1322 as illustrated by a dotted line in FIG. 13. That is, when one of those five computing systems 1312 fails, a replacement computing system will be created and configured using one of those two hardware platforms 1322. Note that a single computing system 1312 might be mapped to a single hardware platform 1322 or to multiple hardware platforms 1322 (e.g., the best platform 1322 might be selected when a failure occurs or there may be pre-determined order to the selection).

ADDITIONAL EMBODIMENTS

The following illustrates various additional embodiments. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although some examples have been described with respect to creating a computing system on a single machine, according to some embodiments a high-level command may be used to create a computing system on a multiple machines (e.g., the high-level command might be "CREATE 20 PC LAN").

Moreover, because embodiments described herein let a relative large number of computing systems be efficiently created, a single machine (or set of machines) may be frequently re-configured and used for another purpose. For example, a set of twenty administrative assistant workstations might be re-configured each night and be used to execute a complex financial simulation that tackles a difficult problem. The machines could then again be re-configured in the morning and be used as normal.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of facilitating creation of computing systems, comprising:
   receiving component and configuration information associated with a computing system to be created, wherein receiving the configuration information comprises receiving a macro-function instruction from an operator;
   determining a target hardware platform to be associated with the computing system;
   automatically determining build information based on the component and configuration information, the target hardware platform, and a pre-defined rule set, wherein determining the build information comprises translating the macro-function instruction into a plurality of primitive functions; and
   arranging for the computing system to be created and configured on the target hardware platform in accordance with the build information.

2. The method of claim 1, wherein the macro-function instruction is associated with at least one of: (i) an operating system, (ii) a patch, (iii) a driver, (iv) an application, (v) a service, or (vi) a configuration.

3. The method of claim 1, wherein determining the target hardware platform comprises:
   receiving an indication of the target hardware platform from an operator via a graphical user interface.

4. A method of facilitating creation of computing systems, comprising:
   receiving component and configuration information associated with a computing system to be created;
   determining a target hardware platform to be associated with the computing system;
   automatically determining build information based on the component and configuration information, the target hardware platform, and a pre-defined rule set, wherein determining the target hardware platform comprises receiving an indication of the target hardware platform from an operator via a graphical user interface;
   arranging for the computing system to be created and configured on the target hardware platform in accordance with the build information; and
   determining whether the indicated target hardware platform is appropriate based on the component and configuration information.

5. The method of claim 4, wherein determining the target hardware platform comprises:
   automatically selecting the target hardware platform from a set of available hardware platforms in accordance with the component and configuration information.

6. A method of facilitating creation of computing systems, comprising:
   receiving component and configuration information associated with a computing system to be created;
   determining a target hardware platform to be associated with the computing system wherein determining the target hardware platform comprise automatically selecting the target hardware platform from a set of available hardware platforms in accordance with the component and configuration information;
   automatically determining build information based on the component and configuration information, the target hardware platform, and a pre-defined rule set;
   arranging for the computing system to be created and configured on the target hardware platform in accordance with the build information; and
   determining whether an appropriate target hardware platform is available based on the component and configuration information.

7. The method of claim 6, further comprising:
   receiving registration information from a plurality of potential target hardware platforms.

8. The method of claim 6, wherein arranging for the computing system to be created comprises:
   transmitting installation information to the target hardware platform, wherein the installation information is adapted to be executed by the target hardware platform in order to create the computing system.

9. A method of facilitating creation of computing systems, comprising:
   receiving component and configuration information associated with a computing system to be created;
   determining a target hardware platform to be associated with the computing system;
   automatically determining build information based on the component and configuration information, the target hardware platform, and a pre-defined rule set; and
   arranging for the computing system to be created and configured on the target hardware platform in accordance with the build information, wherein arranging for the computing system to be created comprises transmitting installation information to the target hardware platform, wherein the installation information is adapted to be executed by the target hardware platform in order to create the computing system,
   wherein the target hardware platform is to retrieve install files from a build database server in accordance with the installation information.

10. The method of claim 9, wherein said transmitting is performed by an install server.

11. The method of claim 10, wherein the install server is one of a plurality of install servers.

12. The method of claim 9, wherein the build information is associated with a plurality of applications for the target hardware platform.

13. The method of claim 9, wherein the build information is associated with a plurality of target hardware platforms.

14. A computer-readable medium storing instructions adapted to be executed by a processor to perform a method to facilitate creation of computing systems, said method comprising:
   receiving component and configuration information associated with a computing system to be created, wherein receiving the configuration information comprises receiving a macro-function instruction from an operator;
   determining a target hardware platform to be associated with the computing system;
   automatically determining build information based on the component and configuration information, the target hardware platform, and a pre-defined rule set, wherein determining the build information comprises translating the macro-function instruction into a plurality of primitive functions; and
   arranging for the computing system to be created and configured on the target hardware platform in accordance with the build information.

15. The medium of claim 14, wherein the macro-function is associated with a meta-language adapted to describe a desired system and functionality across different platforms.

16. The medium of claim 15, wherein the macro-function instruction is associated with at least one of: (i) an operating system, (ii) a patch, (iii) a driver, (iv) an application, (v) a service or (vi) a configuration.

17. An install server, comprising:
a processor; and
a storage device in communication with said processor and storing instructions adapted to be executed by said processor to:
receive component and configuration information associated with a computing system to be created, wherein the configuration information includes a macro-function instruction received from an operator;
determine a target hardware platform to be associated with the computing system;
automatically determine build information based on the component and configuration information, the target hardware platform, and a pre-defined rule set, wherein the build information is determined at least in part by translating the macro-function instruction into a plurality of primitive functions; and
arrange for the computing system to be created and configured on the target hardware platform in accordance with the build information.

18. The install server of claim 17, wherein the macro-function instruction is associated with at least one of: (i) an. operating system, (ii) a patch, (iii) a driver, (iv) an application, or (v) a service.

19. The install server of claim 17 wherein determining the build information comprises: translating the macro-function instruction into a plurality of primitive functions.

* * * * *